United States Patent Office 3,616,593

Patented Nov. 2, 1971

3,616,593

METHOD FOR PREPARING CHEMILUMINESCENT COMPOSITIONS AND DEVICES CONTAINING TETRAKIS(DISUBSTITUTEDAMINO)ETHYLENES

Sydney Shefler, China Lake, and Harold S. Duff, Ridgecrest, Calif., assignors to the United States of America as represented by the Secretary of the Navy

No Drawing. Filed May 15, 1969, Ser. No. 825,049
Int. Cl. B65b *1/04*
U.S. Cl. 53—37 3 Claims

ABSTRACT OF THE DISCLOSURE

A method for preparing chemiluminescent compositions and devices containing tetrakis(disubstitutedamino)ethylenes, which comprises formulating the composition or filling the device in a normal atmosphere.

GOVERNMENT INTEREST

The invention described herein may be manufactured and used by or for the Government of the United States of America for governmental purposes without the payment of any royalties thereon or therefor.

BACKGROUND OF THE INVENTION

This invention relates to a method for preparing chemiluminescent formulations containing tetrakis(disubstitutedamino)ethylenes or filling devices therewith.

Pruett et al., J. Am. Chem. Soc., 72, 3646 (1950) prepared the first compounds of the series of tetrakis(disubstitutedamino)ethylenes, i.e., tetrakis(dimethylamino) ethylene (TMAE). Upon exposure to air these compounds chemiluminesce for varying periods of time, and it is kown to the art that a small amount of water, alcohol, or other protonic material must be present for light to be emitted by these compounds. In the process of preparing formulations containing tetrakis(disubstitutedamino)ethylene compounds the art teaches that such process must be carried out in an inert atmosphere to protect the compound from premature oxidation with resultant diminishing of chemiluminescent properties. All materials and equipment used are therefore passed through an antichamber to eliminate oxygen and all handling and processing are done through rubber-covered parts in the chamber. Such chambers are expensive, are limited in size, require constant maintenance, and occupy a large amount of floor space. The ordinary handling of equipment in the chamber is difficult and in some cases impossible. The present invention provides for a method which overcomes the herein described difficulties.

It is the general purpose of this invention to provide a method for preparing chemiluminescent formulations and devices containing the tetrakis(disubstitutedamino)ethylenes in a simple, uncluttered and economical manner for use in various signalling and marking devices.

DESCRIPTION OF THE INVENTION

In accordance with the present invention formulations containing tetrakis(disubstitutedamino)ethylene were mixed in normal atmosphere under normal conditions. Tests were conducted on a series of units containing tetrakis(dimethylamino)ethylene to determine the most facile loading procedures. Some samples consisted of varying the degree of exposure of tetrakis(dimethylamino)ethylene to normal atmosphere during loading procedures and other samples were prepared in a dry box with no exposure to other than inert atmosphere.

Specific tetrakis(disubstitutedamino)ethylenes operable as the oxyluminescent material in the compositions of this invention include tetrakis(dimethylamino)ethylene,
tetrakis(N-pyrroldinyl)ethylene,
1,1′,3,3′-tetramethyl-$\Delta^{2,2'}$-bi(imidazolidine),
1,1′,3,3′-tetraethyl-$\Delta^{2,2'}$-bi(imidazolidine),
1,1′-diethyl-3,3′-dimethyl-$\Delta^{2,2'}$-bi(imidazolidine),
1,1′,3,3′-tetramethyl-$\Delta^{2,2'}$-bi(hexahydropyrimidine), and
tetrakis(dimethylaminomethyleneamino)ethylene.

Of these, tetrakis(dimethylamino)ethylene is especially suitable.

In Tables I and II there are shown the results of the series of tests conducted to determine the most facile loading procedure for an oxyluminescent marker containing lithium chloride-impregnated polyethylene and tetrakis(dimethylamino)ethylene. In series A samples of lithium chloride-impregnated polyethylene were taken into a dry box with no exposure to other than inert atmosphere. Tetrakis(dimethylamino)ethylene was added and the marker device was sealed to avoid exposure to air. In series B samples of lithium-chloride-impregnated polyethylene were exposed to ambient air for a period of one minute and then tetrakis(dimethylamino)ethylene was added prior to admission to the dry box. These samples were canned in an oxygen-free dry box. In series C the samples of lithium chloride-impregnated polyethylene were allowed to stand in normal atmosphere at 70–75° F. and 30–40% relative humidity for thirty minutes. This allowed for the hydration of some of the lithium chloride and simulated the loading of the marker device in an open room. The samples with tetrakis (dimethylamino)ethylene, were then cycled with three pump down-refills in the antichamber, and admitted to and canned in the oxygen-free dry box. Series D samples of the same material were exposed to thirty minutes of normal atmosphere at ambient temperatures and 30–40% relative humidity. The dry box has been previously opened to room atmosphere and the samples taken into the dry box without pumpdown. Tetrakis(dimethylamino)ethylene was then added to the samples and the devices were sealed after approximately one minute of air exposure. The devices glowed brightly when canned.

Table I below shows the results at 85° F. and 85% relative humidity of marker units stored at 165° F.

TABLE I.—MARKER UNITS PERFORMANCE AS A FUNCTION OF LOADING TECHNIQUE [a]
(1)

| Series [b] | Integrated output (foot-lambert min.) | Average | Average deviation |
|---|---|---|---|
| A | 340 | | |
| A | 317 | 320 | 13 |
| A | 304 | | |
| B | 313 | | |
| B | 285 | 301 | 10 |
| B | 305 | | |
| C | 392 | | |
| C | 374 | 377 | 8 |
| C | 372 | | |
| D | 359 | | |
| D | 335 | 355 | 13 |
| D | 370 | | |

[a] Units tested at 85° F. and 85% R.H.
[b] Units previously stored 10 days at 165° F.

TABLE II.—MARKER UNITS PERFORMANCE AS A FUNCTION OF LOADING TECHNIQUE [a]

| Series [b] | Integrated output (foot-lambert min.) | Average | Average deviation |
|---|---|---|---|
| A | 330 | | |
| A | 322 | 323 | 3 |
| A | 320 | | |
| A | 322 | | |
| B | 345 | | |
| B | 295 | 319 | 29 |
| B | 353 | | |
| B | 286 | | |
| C | 410 | | |
| C | 330 | 370 | 27 |
| C | 370 | | |
| D | 332 | | |
| D | 312 | 339 | 10 |
| D | 335 | | |
| D | 340 | | |

[a] Units tested at 85° F. and 50% R.H.
[b] Units stored up to 5 weeks at ambient temperature prior to tests.

The results in general show little variation between the series. Where tetrakis(dimethylamino) was added in a normal air atmosphere as shown in Series D, there was at most a five to ten percent deterioration in comparison to Series C. This is significant because it shows that the tetrakis(disubstitutedamino) ethylenes, e.g., tetrakis-(dimethylamino)ethylene can be processed in a normal atmosphere which is counter to the teaching of the art.

Tetrakis(dimethylamino)ethylene can be added to various chemiluminescent formulations in air if the loaded unit is sealed within a minute or two.

In loading the markers for signalling the following procedures are recommended: (1) The lithium chloride-impregnated porous polyethylene should be thoroughly dried prior to loading into the marker packet; (2) the packet is then opened in normal atmosphere for filling with tetrakis(dimethylamino)ethylene; (3) the time from opening the sealed packet until the unit is sealed should not exceed thirty minutes; and (4) the loading of tetrakis(dimethylamino)ethylene in air should be completed within a minute or two.

What is claimed is:

1. The method for preparing a marker unit containing a chemiluminescent compound consisting essentially of a tetrakis(disubstituted)ethylene which comprises:
   providing a marker unit open at one point for receiving a chemiluminescent formulation;
   filling said unit with said chemiluminescent compound consisting essentially of a tetrakis(disubstituted) ethylene selected from the group consisting of tetrakis(dimethylamino)ethylene, tetrakis(N-pyrrolidinyl)ethylene, 1,1′,3,3′-tetramethyl-$\Delta^{2,2'}$-bi(imidazolidine), 1,1′,3,3′-tetraethyl-$\Delta^{2,2'}$-bi(imidazolidine), 1,1′-diethyl-3,3′-dimethyl-$\Delta^{2,2'}$-bi(imidazolidine), 1,1′,3,3′-tetramethyl-$\Delta^{2,2}$-bi(hexahydropyrimidine), and tetrakis(dimethylaminomethyleneamino)ethylene, at ambient temperature in the open air; then
   sealing said unit within about two minutes.

2. The method of claim 1 wherein the tetrakis(disubstituted-amino)ethylene is tetrakis(dimethylamino)ethylene.

3. The method for preparing chemiluminescent formulations which comprises:
   saturating a preselected formulation with tetrakis(dimethylamino)ethylene at room temperature in the open air; and
   canning the saturated product.

References Cited

UNITED STATES PATENTS

| | | | |
|---|---|---|---|
| 3,264,221 | 8/1966 | Winberg | 252—188.3 |
| 3,311,564 | 3/1967 | Cline | 252—188.3 |
| 3,350,553 | 10/1967 | Cline | 252—188.3 X |
| 3,502,588 | 3/1970 | Winberg | 252—188.3 |

JOHN D. WELSH, Primary Examiner

U.S. Cl. X.R.

240—2.25; 252—186, 188.3